July 12, 1966 D. J. COCHRAN ETAL 3,261,004
READ-WRITE AMPLIFIER CIRCUIT
Filed Sept. 4, 1962
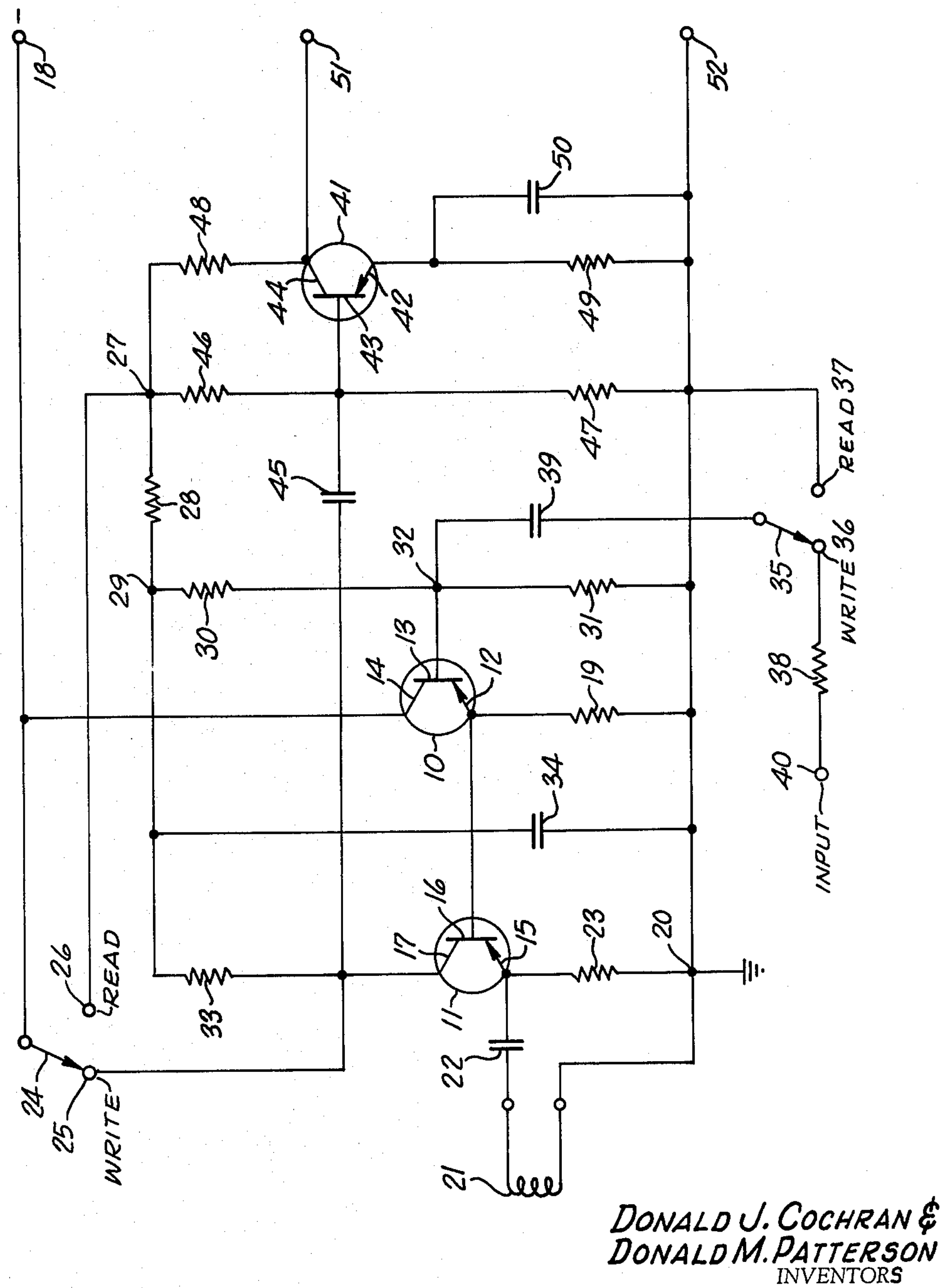
DONALD J. COCHRAN &
DONALD M. PATTERSON
INVENTORS
BY Robert G. Clay
ATTORNEY United States Patent Office 3,261,004

Patented July 12, 1966

3,261,004

READ-WRITE AMPLIFIER CIRCUIT

Donald J. Cochran, Pacifica, and Donald M. Patterson, Sunnyvale, Calif., assignors to Ampex Corporation, Redwood City, Calif., a corporation of California Filed Sept. 4, 1962, Ser. No. 221,214
6 Claims. (Cl. 340—174.1)

This invention relates to read-write amplifier circuits and in particular to read-write amplifier circuits for use in speed control systems of magnetic tape record-playback apparatus.

In magnetic tape recording and playback of high frequency signals, such as television signals, a speed control system is needed to ensure that longitudinal tape position relative to a head drum position is exactly the same in a playback mode as it was in a record mode. The speed control system locks the tape motion from reel-to-reel to the rotation of the head drum so that a previously recorded control track will pass over a control track head. During the record mode, a pulse generating means generates a control signal at a frequency determined by the rate of rotation of the head drum. Such control signal is amplified by a first control amplifier and then recorded along one margin of the magnetic tape by the control track head. In the playback mode, the control track signal is reproduced and amplified by a second control amplifier. The reproduced control track signal is compared with an output signal of the pulse generating means and any difference in phase between the two signals is translated into a control voltage which will speed up or slow down a head drum motor. Therefore, longitudinal tape position relative to the head drum position is exactly the same during the playback mode as it was during the record mode.

Prior speed control systems for magnetic tape record-playback apparatus employed two separate control amplifiers, one during the record mode and the other during the playback mode. Furthermore, this type of speed control system was very complex and expensive since it required two control amplifiers.

It is, therefore, an object of this invention to provide a novel read-write amplifier for use in a magnetic tape record-playback device.

Another object of this invention is to provide a read-write amplifier circuit for use in a speed control system of a magnetic tape recording and playback apparatus.

A further object of this invention is to provide a magnetic tape recording and playback apparatus having a simple and inexpensive speed control system.

Further objects and advantages of the present invention will become apparent from the following detailed description of a preferred embodiment of the invention when taken with the drawing which shows in the sole figure a schematic circuit diagram of the preferred embodiment of the present invention.

In accordance with the present invention, there is provided a single amplifier circuit for use in a magnetic tape recording and playback apparatus and which is adapted for changeover from recording to playback and vice-versa by the actuation of switching means. The read-write amplifier circuit is comprised of a first transistor connected in a grounded-collector configuration during both recording and playback and a second transistor connected in a grounded-collector configuration during recording and in a grounded-base configuration during playback. The switching means couples a power supply to the collector electrode of the second transistor, thereby connecting the second transistor in a grounded-collector configuration to provide current amplification during recording. Thus, signal information passes through the grounded-collector amplifiers to a read-write head that is coupled to the emitter electrode of the second transistor. During playback, the circuit configuration of the second transistor is switched from grounded-collector to grounded-base. This is accomplished by coupling the power supply to the base electrode of the first transistor through a voltage dividing means. The voltage dividing means allows the base electrode of the first transistor to attain a potential that is fed through the first transistor to the base electrode of the second transistor. The potential acts to establish the D.C. operating point of the second transistor, thereby connecting the second transistor in a grounded-base configuration to provide voltage amplification during playback. The switching means also couples the power supply to the collector electrode of the second transistor through a load resistor. Thus, the previously recorded information is detected by the read-write head and then amplified by the grounded-base amplifier. The novel read-write amplifier circuit, therefore, is able to amplify signal information in two directions by utilizing two transistors connected as grounded-collector amplifiers during recording and as grounded-base and grounded-collector amplifiers during playback.

Referring to the sole figure, there is shown a read-write amplifier circuit for use in the control system of a magnetic tape recording and playback apparatus. The read-write amplifier circuit is comprised of a pair of PNP transistors 10 and 11, each having the usual emitter, base and collector electrodes, which are indicated by reference numerals 12, 13 and 14, respectively, for transistor 10 and reference numerals 15, 16 and 17, respectively, for transistor 11. Transistor 10 is connected in a grounded-collector configuration by coupling its collector electrode 14 to the negative terminal of the power supply 18 and keeps this circuit configuration during both recording and playback. An emitter load resistor 19 is coupled between the emitter electrode 12 of transistor 10 and a ground terminal 20. The emitter output of transistor 10 is coupled to the base electrode 16 of transistor 11. One end of a read-write head winding 21 is connected to the emitter electrode 15 of transistor 11 through a coupling capacitor 22 while the other end is connected to the ground terminal 20. The emitter electrode 15, of transistor 10 is coupled to the ground terminal 20 through a current-limiting resistor 23.

The read-write amplifier circuit is changed from recording to playback and vice-versa by the actuation of a first switching device 24. The negative terminal of the power supply 18 is selectively connected, through switch 24, to either a write terminal 25 or a read terminal 26. During the record mode, the switch 24 couples the negative terminal of the power supply 18 to the collector electrode 17 of transistor 11 to connect transistor 11 in a grounded-collector configuration. This enables transistor 11 to provide current amplification to relatively high voltage signal information. Transistor 41 is not connected to the negative terminal of the power supply 18, and therefore it does not conduct during the record mode. Thus, the signal information passes through the current amplifiers 10 and 11 to the read-write head winding 21 connected across the output circuit of amplifier 11.

During the playback mode, the switch 24 connects the negative terminal of the power supply 18 to common terminal 27, which is coupled to common terminal 29 through resistor 28. A voltage dividing means, consisting of series-connected resistors 30 and 31 having a common terminal 32 therebetween, is coupled between the common terminal 29 and the ground terminal 20, and has its common terminal 32 connected to the base electrode 13 of transistor 10. The switch 24, therefore, couples the negative terminal of power supply 18 to the base electrode 13 of transistor 10 through the resistors 28, 30 and 31. The base electrode 13 of transistor 10 attains a potential equal to the voltage across resistor 31, and then the grounded-collector amplifier 10 feeds the potential through to its emitter electrode 12. The emitter output of the grounded-collector amplifier 10 provides a low impedance bias potential for the base electrode 16 of transistor 11. The potential acts to establish the D.C. operating point of transistor 11, thereby connecting transistor 11 in a grounded-base configuration. This enables transistor 11 to provide voltage amplification to detected signal information which has a low voltage. The switch 24 also couples the negative terminal of the power supply 18 to the collector electrode 17 of transistor 11 through resistor 28 and load resistor 33.

A decoupling capacitor 34 is connected between the common terminal 29 and the ground terminal 20. Resistor 28 and capacitor 34 form a decoupling network for filtering out noise from the power supply 18.

The read-write amplifier circuit is changed from recording to reproducing and vice-versa by the actuation of a second switching device 35. A pulse shaping network consisting of resistor 38 and capacitor 39 is coupled between the common terminal 32 or the base electrode 13 of transistor 10 and input terminal 40. The capacitor 39 is coupled between the common terminal 32 and switch 35 while the resistor 38 is coupled between the input terminal 40 and a write terminal 36. Read terminal 37 is connected to ground terminal 20. The base electrode 13 of transistor 10 is selectively coupled, through capacitor 39 and switch 35, to either write terminal 36 or read terminal 37.

During recording, signal information at input terminal 40 is shaped by the pulse shaping network before it is applied to the base electrode 13 of transistor 10. In playback, the base electrode 13 of transistor 10 is coupled to the ground terminal 20 through the capacitor 39 which serves as a bypass capacitor for filtering out noise.

During the playback mode, the output of the grounded-base amplifier 11 is connected to a second amplification stage comprising PNP transistor 41 having emitter electrode 42, base electrode 43 and collector electrode 44. The collector electrode 17 of transistor 11 is connected to the base electrode 43 of transistor 41 through a coupling capacitor 45. A voltage divider consisting of resistors 46 and 47 is coupled between the common terminal 27 and the ground terminal 20 for biasing the base electrode 43 of transistor 41. The collector electrode 44 of transistor 41 is connected to the common terminal 27 through load resistor 48 while its emitter electrode 42 is connected to ground terminal 20 through current-limiting resistor 49. A bypass capacitor 50 is coupled across the resistor 49 for shunting alternating current components to ground. The output, during the playback mode, is taken across output terminal 51 or collector electrode 44 and output terminal 52 or ground terminal 20.

In operation, switches 24 and 35 (as shown) are preferably ganged and are connected to the write terminals 25 and 36, respectively. As previously mentioned, switch 24 couples the negative terminal of power supply 18 to the collector terminal 17 of transistor 11 to connect transistor 11 in a grounded-collector configuration. Switch 35 couples the base electrode 13 of the grounded-collector transistor 10 to the input terminal 40 through the pulse shaping network consisting of resistor 38 and capacitor 39. Since the collector electrode 44 of transistor 41 is disconnected from the negative terminal of the power supply 18, transistor 41 does not operate during recording. A pulse generating means (not shown) generates signal information, such as a square wave, that is applied to the input terminal 40. The square wave is differentiated by the RC pulse shaping network to produce sharp positive and negative pulses. The sharp negative pulses pass through the PNP transistors 10 and 11 to the read-write head winding 21, and then are recorded on a magnetic tape (not shown).

During playback, switches 24 and 35 are connected to the read terminals 26 and 37, respectively. As previously mentioned, switch 24 connects the negative terminal of the power supply 18 to the base electrode 13 of transistor 10 through resistors 28, 30 and 31. Switch 24 also couples the negative terminal of the power supply 18 to the collector electrode 17 of transistor 11 through resistors 28 and 33. Switch 35 couples the base electrode 13 of transistor 10 to ground terminal 20 through capacitor 39. By way of example, assume that negative terminal of the power supply 18 has a potential of 20 volts. Since resistor 28 is very small compared with resistors 30 and 31, it can be neglected, and the negative 20-volt potential appears across resistors 30 and 31. Resistor 30 is many times larger than resistor 31, and therefore most of the potential appears across resistor 30. Assume that there is a negative 18-volt drop across resistor 30 and a negative 2-volt drop across resistor 31. The base electrode 13 of transistor 10 attains a potential equal to the negative 2 volts across resistor 31 and then the grounded-collector amplifier 10 feeds the negative 2-volt potential through to base electrode 16 of transistor 11. The 2-volt potential establishes the D.C. operating point of transistor 11, thereby connecting transistor 11 in a grounded-base configuration. The previously recorded pulses on the magnetic tape (not shown) are detected by the read-write head winding 21 and appear at the emitter electrode 15 of transistor 11. The detected pulses are amplified by transistor 11 and then further amplified by transistor 41. The amplified pulses appear across the output terminals 51 and 52.

Thus, it is seen that this read-write amplifier circuit is able to amplify signal information in two directions. Although the preferred embodiment has illustrated transistors 10, 11 and 41 to be PNP conductivity type transistors, it is appreciated that NPN conductivity type transistors may also be employed with corresponding changes in potential requirements. It is also appreciated that vacuum tubes can be used in place of transistors.

Although the read-write amplifier is particularly useful in a control system of a magnetic tape record-playback apparatus, it can also be used in other magnetic tape record-playback apparatus, such as computers and instrumentation devices.

Although the present invention has been shown and described in terms of a preferred embodiment, changes and modifications which do not depart from the inventive concepts taught herein will suggest themselves to those skilled in the art. Such changes and modifications are deemed to fall within the scope of this invention.

What is claimed is:

1. A read-write amplifier circuit comprising first and second amplifying devices each having input, output, and common electrodes, a transducer coupled to said output electrode of said second amplifying device, means coupling said output electrode of said first amplifying device to said input electrode of said second amplifying device, a load impedance, a signal input circuit for feeding an input signal to said input electrode of said first amplifying device during recording, a power supply, means connecting said supply to said common electrode of said first amplifying device, and first and second switching means each having record and playback positions, said first switching means in said record position thereof defining circuit enabling means for connecting said power supply to said common electrode of said second amplifying device, said second switching means in said record position thereof defining circuit enabling means for coupling said signal input circuit to said input electrode of said first amplifying device, said first switching means in said playback position thereof defining circuit enabling means for coupling said power supply through said load impedance to said common electrode of said second amplifying device and for coupling a portion of the output potential of said power supply to said input electrode of said first amplifying device, said second switching means in said playback position thereof defining circuit disabling means for decoupling said input circuit from said input electrode of said first amplifying device, whereby in response to said first and second switching means being in said record positions thereof said input signal is amplified by said first and second amplifying devices and applied to said transducer and in response to said first and second switching means being in said playback positions thereof said second amplifying device is biased such that said input, output, and common electrodes thereof respectively function as common, input, and output electrodes to amplify a signal from said transducer and apply same to said load impedance.

2. A read-write amplifier circuit comprising first and second amplifying devices each having input, output, and common electrodes, a transducer, means coupling said transducer between said output electrode of said second amplifying device and ground, means coupling said output electrode of said first amplifying device to said input electrode of said second amplifying device, a load impedance having a first side connected to said common electrode of said second amplifying device and having a second side, a voltage divider having first and second sides and an intermediate tap, said first side of said divider connected to ground, said tap of said divider connected to said input electrode of said first amplifying device, load impedance means coupling said output electrode of said first amplifying device to ground, a power supply connected to said common electrode of said first amplifying device, first switching means having write and read positions, said first switching means having circuit enabling means in said write position for connecting said power supply to said common electrode of said second amplifying device, said first switching means having circuit enabling means in said read position for connecting said power supply to said second side of said second amplifying device load impedance and to said second side of said voltage divider, a signal input circuit for generating a signal for recording, and second switching means having write and read positions, said second switching means having circuit enabling means in said write position for coupling said input circuit to said input electrode of said first amplifying device, said second switching means having circuit disabling means in said read position for decoupling said input circuit from said input electrode of said first amplifying device.

3. A read-write amplifier circuit according to claim 2, further defined by a third amplifying device having input, output, and common electrodes, means coupling said common electrode of said second amplifying device to said input electrode of said third amplifying device, means coupling said common electrode of said third amplifying device to ground, and by said first switching means having circuit enabling means in said read position for coupling said power supply to said input and output electrodes of said third amplifying device to bias same.

4. A read-write amplifier circuit comprising first and second transistors each having emitter, base, and collector electrodes, means connecting said first transistor in a grounded-collector configuration during both recording and playback, a read-write head coupled to the emitter electrode of said second transistor, means coupling the emitter electrode of said first transistor to the base electrode of said second transistor, a load impedance connected to the collector electrode of said second transistor, a voltage dividing means coupled to the base electrode of said first transistor, a power supply, first switching means having record and playback positions, said switching means in said record position having circuit enabling means for connecting said power supply to the collector electrode of said second transistor to connect same in a grounded-collector configuration during recording, said switching means in said playback position having circuit enabling means for coupling said power supply to the collector electrode of said second transistor through said load impedance and coupling said power supply to said voltage dividing means, said voltage dividing means thereby establishing a bias potential at the base electrode of said first transistor which is fed through said first transistor to the base electrode of said second transistor to establish a D.C. operating point to connect said second transistor in a grounded-base configuration during playback, input circuit means for feeding a signal to the base of said first transistor during recording, and second switching means having record and playback positions, said second switching means in said record position thereof having circuit enabling means for coupling said input circuit means to the base electrode of said first transistor, said second switching means in said playback position thereof having circuit disabling means for decoupling said input circuit means from the base electrode of said first transistor.

5. A read-write amplifier circuit according to claim 4, further defined by a third transistor having emitter, base, and collector electrodes, means coupling said collector of said second transistor to said base of said third transistor, means coupling said emitter of said third transistor to ground, and said first switching means in said playback position having circuit enabling means coupling said power supply to said collector and base electrodes of said third transistor to bias same.

6. A read-write amplifier circuit comprising first, second, and third transistors each having emitter, base, and collector electrodes, said emitter electrode of said first transistor connected to said base electrode of said second transistor, first, second, and third resistors respectively coupling the emitter electrodes of said first, second, and third transistors to ground, a by-pass capacitor connected in parallel with said third resistor, a read-write head coupled between said emitter electrode of said second transistor and ground, fourth and fifth resistors each having first and second sides, said first sides of said fourth and fifth resistors respectively connected to said collector electrodes of said second and third transistors, a power supply connected to said collector electrode of said first transistor, first and second voltage dividers each having first and second sides and an intermediate tap, said first sides of said first and second dividers connected to ground and said taps thereof respectively connected to said base electrodes of said first and third transistors, a first switch having write and read terminals and enabling means for selectively closing circuits with said write and read terminals, said write terminal connected to said collector of said second transistor, said enabling means connected to said power supply, means coupling said second sides of said fourth and fifth transistors and said second sides of said first and second dividers to said read terminal, a second switch having write and read terminals and enabling means for selectively closing circuits with said write and read terminals, said read terminal of said second switch connected to ground, a capacitor connected between said enabling means of said second switch and said base electrode of said first transistor, a signal input terminal, and a resistor connected between said signal input terminal and said write terminal of said second switch.

No references cited.

BERNARD KONICK, *Primary Examiner.*